US007824104B2

(12) United States Patent
Brinkmann et al.

(10) Patent No.: US 7,824,104 B2
(45) Date of Patent: Nov. 2, 2010

(54) ADAPTABLE SLIDE BEARING FOR TELESCOPIC CRANE JIBS

(75) Inventors: Jan Brinkmann, Oldenburg (DE); Franz Paschke, Sande (DE); Rocco Staatz Tepper, Varel (DE)

(73) Assignee: Grove U.S., L.L.C., Shady Grove, PA (US)

( * ) Notice: Subject to any disclaimer, the term of this patent is extended or adjusted under 35 U.S.C. 154(b) by 478 days.

(21) Appl. No.: 11/363,370

(22) Filed: Feb. 28, 2006

(65) Prior Publication Data

US 2006/0204152 A1 Sep. 14, 2006

(30) Foreign Application Priority Data

Mar. 1, 2005 (DE) ...................... 10 2005 009 348

(51) Int. Cl.
*F16C 17/26* (2006.01)
*F16C 33/00* (2006.01)

(52) U.S. Cl. .......................................... 384/35; 384/42

(58) Field of Classification Search .................. 384/35, 384/37-39, 40, 42, 7, 10, 26; 29/898.03
See application file for complete search history.

(56) References Cited

U.S. PATENT DOCUMENTS

| | | | | |
|---|---|---|---|---|
| 4,168,008 | A | | 9/1979 | Granryd |
| 4,509,870 | A | * | 4/1985 | Taki ........................... 384/296 |
| 5,632,395 | A | | 5/1997 | Zimmermann |
| 5,829,606 | A | | 11/1998 | Erdmann |
| 5,865,328 | A | | 2/1999 | Kaspar |
| 6,108,985 | A | * | 8/2000 | Paschke et al. ................ 52/118 |
| 6,499,612 | B1 | * | 12/2002 | Harrgington et al. ........ 212/350 |

FOREIGN PATENT DOCUMENTS

| | | | |
|---|---|---|---|
| DE | 1123719 | | 2/1962 |
| DE | G 93 08 993.7 | U1 | 8/1993 |
| DE | 697 16 660 | T2 | 9/1997 |
| DE | 200 15 831 | U1 | 1/2001 |
| DE | 100 20 866 | A1 | 10/2001 |
| EP | 0 669 279 | A1 | 8/1995 |
| EP | 0 794 148 | A2 | 9/1997 |
| EP | 0 922 664 | A2 | 6/1999 |
| FR | 2 759 687 | | 8/1998 |
| JP | 2001-80884 | A | 3/2001 |

* cited by examiner

*Primary Examiner*—Thomas R Hannon
*Assistant Examiner*—James Pilkington
(74) *Attorney, Agent, or Firm*—Birch, Stewart, Kolasch & Birch, LLP

(57) ABSTRACT

A telescopic crane jib-slide bearing part comprises a receiver and a filler compound introduced into the receiver. A telescopic crane jib-slide bearing includes one or more such slide bearing parts.

15 Claims, 4 Drawing Sheets

ADAPTABLE SLIDE BEARING FOR TELESCOPIC CRANE JIBS

FIELD OF THE INVENTION

The invention relates to slide bearings for telescopic crane jibs. In particular, it relates to a telescopic crane jib slide bearing part, a telescopic crane jib slide bearing and a telescopic part slide bearing arrangement for a telescopic crane jib. It advantageously lends itself to applications in portable cranes or mobile cranes.

BACKGROUND OF THE INVENTION

The bearing arrangement of the telescopic parts of telescopic crane jibs, and in particular the slide bearing between telescopic parts, influences the load bearing characteristics of the jib as a whole to a high degree. This factor has assumed even greater importance in recent times due to the fact that high tensile materials permit a more lightweight construction of the telescopic parts. Because of the resulting thinner wall thicknesses, bigger deformations can occur in the region of the sliding bearing and in the jib as a whole. In order to keep deformations to an absolute minimum and thus optimise the load bearing characteristics, negative influences from other sources must be minimised. For example, the mounting or the slide mounting of the telescopic parts must be designed so that the load carrying capacity is impaired as little as possible. To this end, it is important to support the slide bearing arrangement in its cross-sectional regions that are most exposed to risk in terms of stability and prevent uneven carrying behaviour and hence additional moments occurring in cross-sectional regions subjected to high loads.

Conventional slide bearings have slide blocks, which are mounted between the telescopic parts. Such slide blocks are of a specific width, which renders adjustments and readjustments difficult because it is necessary to replace the slide block with a wider or narrower one, for example. Abrasion during operation can also give rise to bearing defects and the subsequent adjustment or replacement work is time-consuming and expensive.

The present invention is directed to a slide bearing arrangement for telescopic crane jibs which overcomes the problems outlined above. In particular, the slide bearing arrangement of the invention is adaptable to a specific telescopic crane jib and permits a uniform load bearing characteristics over a long service life without major expense.

The invention comprises a telescopic crane jib slide bearing part which has a receiving means and a filler compound which is introduced into the receiving means. Based on a construction of this type, the slide bearing part can be adapted to any situation in the bearing gap without the need for further measures and can be adapted simply by introducing a specific filler compound in a specific way, or by introducing a specific quantity of filler compound into the receiving means until the optimum shape is achieved for the slide block. As a result an optimum shape adaptation and conformity can be achieved with respect to the abutting telescopic parts, using a bearing of a simple design and simple manufacture. The telescopic parts can be mutually aligned without any major effort and can also be changed if necessary.

The receiving means of the invention may be a hollow body, in particular a hollow section or a hose-shaped hollow body.

Alternatively, the receiving means may also be provided in the form of a shell. Such a shell forms a peripheral boundary and the cavity between two telescopic parts can be filled out with friction-resistant and abrasion resistant plastic material using an injection casting process. The adaptability and conformity advantages of the invention are also realized with this system.

The receiving means is preferably made from a material that is capable of conforming to a shape and may contain a friction-resistant and abrasion-resistant material, in particular a polyamide or polyethylene reinforced with glass fibre.

According to the invention, the filler compound may contain a material which can be solidified, such as by curing, and which is capable of conforming to a shape. It may be pressed, injected or injection-cast into the receiving means. In particular, the filler compound may be made from one or more of the following materials or contain one or more of the following materials:

- a thermoplastic material;
- a thermosetting plastic, in particular in the form of a casting resin or a moulding compound with or without fibre reinforcement;
- a plastic foam;
- a liquid that is capable of crystallisation, in particular sodium acetate; and/or
- an elastomer.

A Teflon core (PTFE) may be accommodated in the receiving means. In particular, a Teflon core may be incorporated in the hollow sections or hoses, and a compression force may be applied from outside, for example, as a result of which, because of its viscous properties, it fills out the gap between the telescoping sections. Once the receiving means has been closed, therefore, a uniform and balancing force distribution can be achieved during operation, depending on the load state.

The present invention further comprises a telescopic crane jib slide bearing part which has one or more slide bearing parts, as described above. If several slide bearing parts are provided, they may be disposed in a mutually abutting arrangement. It is also possible for the outer frames of the slide bearing parts in a slide bearing to be of the same or different lengths as a means of adapting to a specific application.

One advantageous feature of a slide bearing according to the invention is that filaments may be provided in the receiving means, between the slide bearing parts or at their edges. These filaments may be used for plasticizing or liquefying the material by means of heat in order to achieve conformation to the appropriate shapes.

The present invention relates to a telescopic bearing arrangement for a telescopic crane jib comprising at least one slide bearing part, as described above. The slide bearing may be disposed between two adjacent telescopic parts or sections of the jib, for example in the collar of an outer telescopic part and/or in the base piece of an inner telescopic part. The slide bearing parts may be disposed partially or fully over the entire overlap areas and are used to support areas of the jib that are more at risk in terms of stability when subjected to high thrust loads.

The telescopic slide bearing arrangement according to the invention may include abutments provided in the end frames and/or on the jib sections, which are engaged by the receiving means filled with the filler compound. Such an arrangement secures the bearings axially and/or in the circumferential direction. The abutment may be provided in the form of a locating or engaging arrangement, in particular as a bead arrangement, aperture arrangement or web arrangement.

BRIEF DESCRIPTION OF THE DRAWINGS

The invention will now be described in more detail with reference to the appended drawings which illustrates particular embodiments. The invention may incorporate all of the features described here, either individually or in any combination.

DETAILED DESCRIPTION OF THE INVENTION

Figure 1:
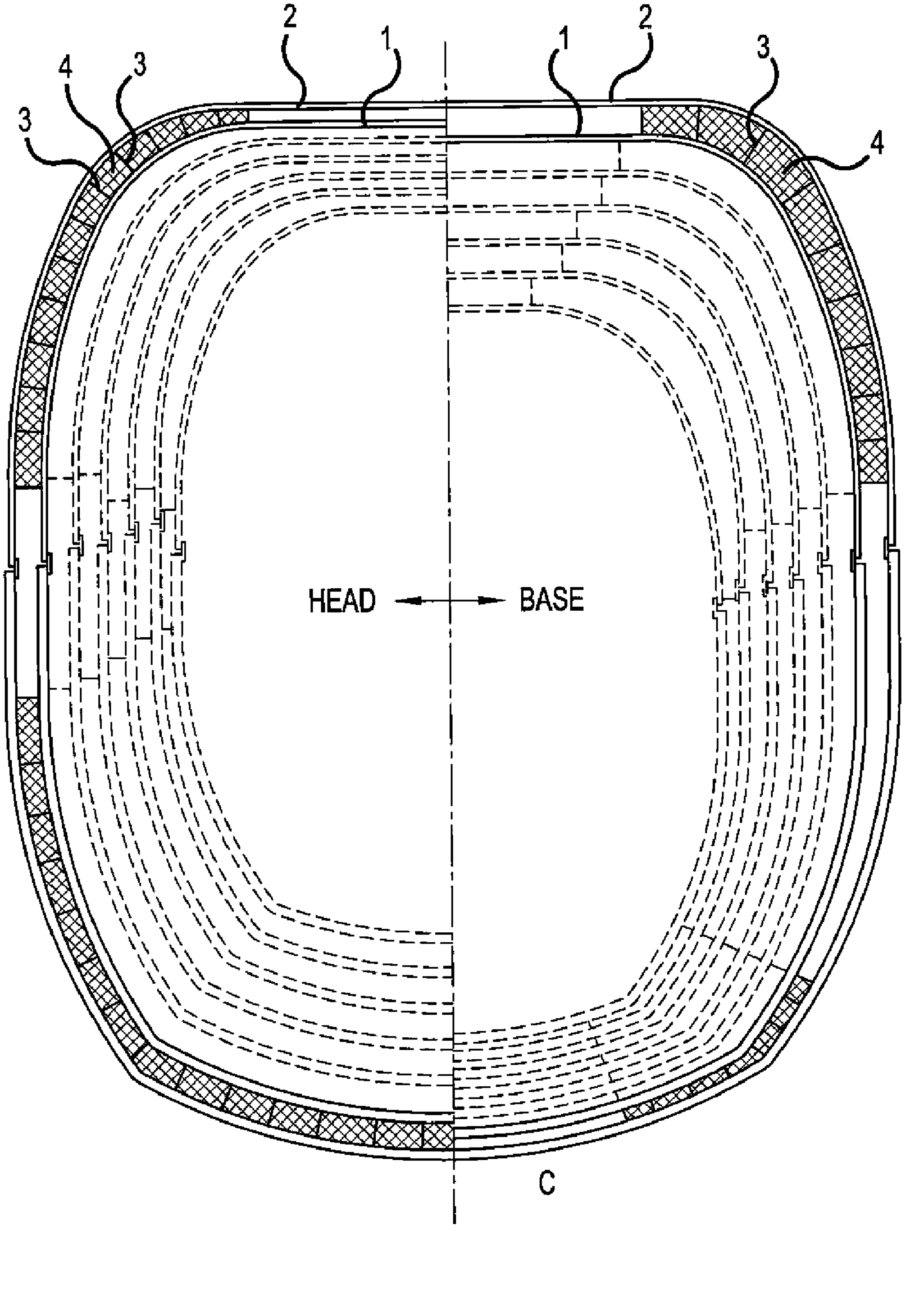
FIG. 1 illustrates a jib cross-section with a slide bearing according to the invention inserted between two telescopic jib parts. The portion of FIG. 1 to the left-hand side of the center line illustrates the bearing arrangement in the telescopic part collar region (head), whilst the bearing arrangement in the base region is illustrated on the right-hand side of the center line.

In FIG. 1, two telescopic parts 1 and 2 of the jib are illustrated in x-section, namely an inner telescopic part 1 and an outer telescopic part 2. The respective slide bearings according to the invention are inserted between the telescopic parts 1 and 2 extending across the corner regions of these telescopic parts 1 and 2. In the embodiment illustrated, these slide bearings are hollow sections having boundary side walls 3. A filler compound is introduced into the hollow sections formed by the boundaries 3, and is denoted by reference number 4.

Figure 2:
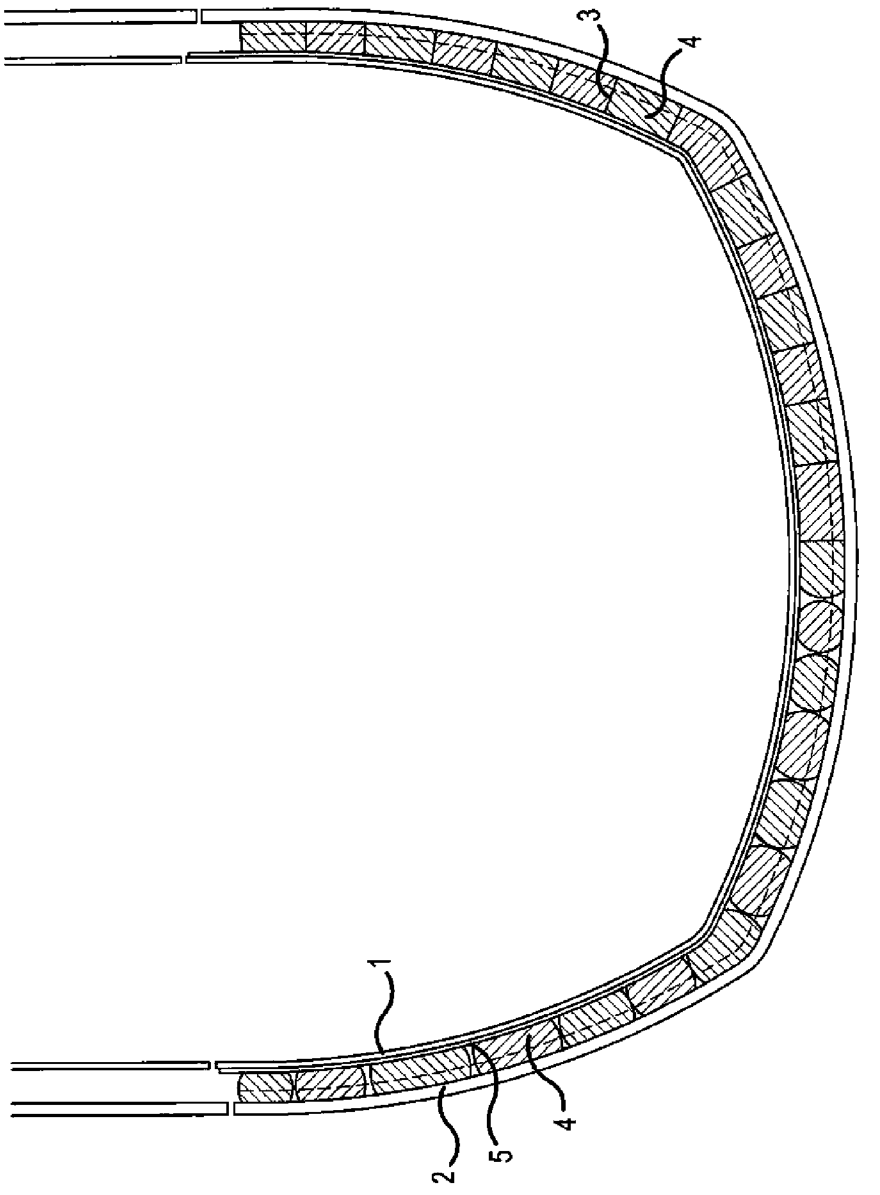
FIG. 2 shows regions of a cross-sectional view with different embodiments of the slide block parts.
Figure 4:
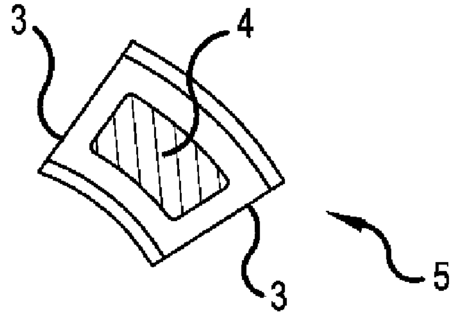
FIG. 4 is a sectional view of a receiver according to the invention comprising a core of, i.e., Teflon.

Instead of the hollow sections, it would also be possible to use hose-type or tubular type receiving means, as illustrated at 5 in the left-hand part of the cross-section illustrated in FIG. 2. These hoses 5 also contain filler compound 4. The right-hand side of FIG. 2 again illustrates receiving means 3 in the form of a hollow section or shell. FIG. 4 shows a hose-shaped element 5 in cross section and greater detail, including filler compound 4 forming a core, which may comprise, i.e., Teflon.

The hoses 5 or hollow sections 3 are made from a material that is capable of conforming to a shape, particularly a friction-resistant (i.e., low-friction) and abrasion-resistant material, e.g. polyamide or polyethylene reinforced with glass fibre. The filler material can be solidified, such as by curing, and likewise is also capable of conforming to a shape, and may be one of the materials described above.

The telescopic parts 1, 2 are mutually positioned and aligned by injecting the curable plastic (filler compound). The solidification process may take place in various ways as known to those skilled in such processes and will depend on the choice of material used for the filler compound. A material may be selected which crystallises when liquid is removed, which is injected or pressed in when hot and then solidifies on cooling, or alternatively a material which is viscous when cold and is plasticized and/or solidified by a heating process.

According to the invention, the hollow sections or shells may be hollow tubular or flexible pipe-like elements. These could have a round or a non-round (polygonal) shape in cross section. The receiving means may be deformable in such a way that, during the adjustment of the boom parts relative to each other, and prior to filling in of the filler compound, the receiving means is deformed and subsequently solidified in the deformed state.

The term "shells" can include structures which have an open cross section. The filling material is thus held by the shell segments at the side portions, and confined by the respective crane structures where no shell surface part is present. Various types of such shell structures may be formed by injection molding wherein the shell parts and the filling material are injected into a gap between adjacent boom parts simultaneously by two or more injection units. In this case, the plastic materials utilized should have little or no adhesion with respect to each other.

Plates of wood or plastic with spacers could be used as shells. Welded metal plates could also be used. In that case, such metal plates should have a height that is smaller than the distance between the adjacent telescopic jib parts.

The filler material is placed into the receiving means by, for example, injection molding, as noted above. The filler material may also be placed in the receiving means by injecting and embossing, wherein the injected filler material is thereafter sandwiched between the opposing structures of the adjacent boom parts. Foamed plastic material can be used as the filler material. This may comprise a thermoplastic, elastomeric or duroplastic material.

In addition to affording a good sliding action for the telescopic parts in the direction in which the jib is oriented, the slide bearing arrangement also compensates for tolerances and manufacturing inaccuracies and supports areas of the jib that are more at risk in terms of stability when subjected to high thrust loads. The slide bearing is, nevertheless, easy to produce and manipulate. It is apparent that very few parts are needed.

Based on an appropriate selection of shapes and materials for the receiving means (hollow sections, hoses, shells) and the filler compound, it is possible to vary the stiffness in different regions of the sliding bearing and a super-elevation of the jib can also be compensated.

The slide bearing proposed by the invention can be easily secured, namely by engaging with or acting on abutments specifically provided for this purpose or already existing in the jib section. These may take various forms such as beads, apertures, webs, screw connections, etc. which are embedded when the filler compound or viscous substances are introduced and thus fix the slide bearing in both the longitudinal direction and tangentially (in a peripheral direction).

Figure 3:
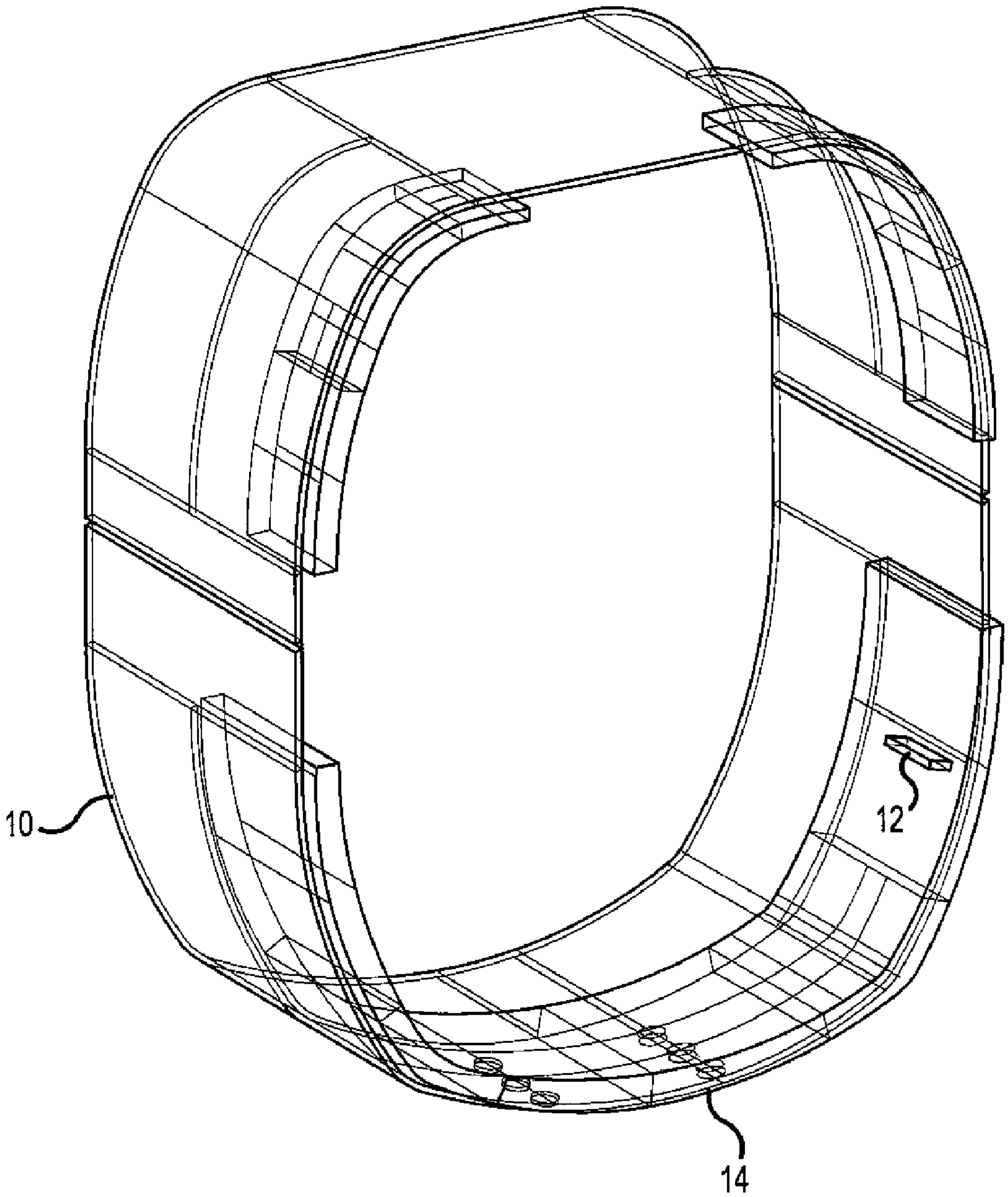
FIG. 3 illustrates a collar portion of a telescopic jib part which includes abutment formations which fix slide bearing elements in position.

FIG. 3 illustrates an end portion 10 of a telescopic jib section. The end portion 10 may comprise, for example, a bead 12 which could become embedded within the filler compound or viscous substances introduced during the formation of the slide bearing, thus stabilizing the position of the slide bearing. Alternatively, an abutment element may comprise one or more holes 14 into which some of the filler compound or viscous substances protrude upon formation of the slide bearing elements, similarly stabilizing the position of the bearing elements.

Figure 5:
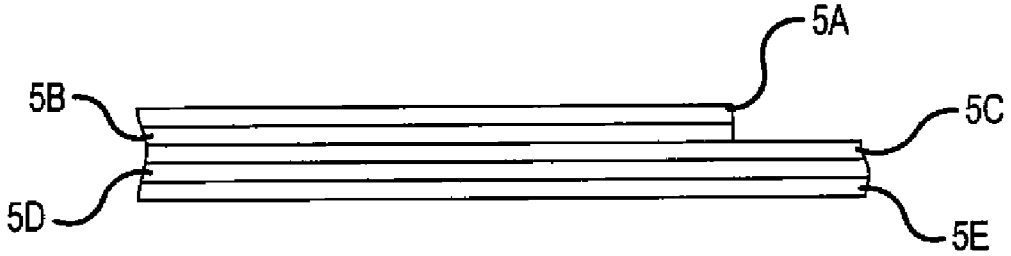
FIG. 5 is a side view of receivers according to the invention, some of the receivers being of similar lengths to each other and some having different lengths.

Depending on the specific configuration of the end portion of the telescopic jib section or to meet specific needs, the receivers of the slide bearing parts can be of the same length or of different lengths. FIG. 5 illustrates several receiver elements in side view, wherein receiver elements 5A and 5B are of a first length and elements 5C, 5D and 5E are of a different greater length. If positioned in an end portion of a jib, as shown in end view in FIGS. 1 and 2, the longer receivers 5C-5E would extend further into the end portion of the jib section than receivers 5A-5B.

The invention claimed is:

1. A telescopic crane slide bearing part for facilitating telescopic movement of relatively moveable jib sections, comprising a receiver interposed in a space between adjacent relatively telescopic jib sections, said receiver contacting mutually facing first and second slide surfaces, respectively, of first and second relatively telescopic jib sections; and a filler compound introduced into the receiver positioned between said jib sections;

said filler compound comprising a material that is introduced into the receiver in a non-solid form, which conforms to a shape defined by the first and second slide surfaces of the relatively telescopic jib parts and solidifies whereby said slide bearing part assumes a shape and fills a space defined by said first and second sliding surfaces.

2. A telescopic crane slide bearing part as claimed in claim 1, further comprising a Teflon core in the receiver.

3. A telescopic crane slide bearing part as claimed claim 1, wherein the receiver comprises a material that is capable of conforming to a shape defined by the mutually facing first and second slide surfaces when said receiver is interposed between adjacent jib sections.

4. A telescopic crane slide bearing part as claimed in claim 1, wherein the receiver comprises a friction-resistant and abrasion-resistant material comprising polyamide or glass fiber-reinforced polyethylene.

5. A telescopic crane slide bearing part as claimed in claim 1, wherein the filler compound comprises one or more of the following materials:

a thermosetting plastic;

a casting resin or a moulding compound;

a casting resin or a moulding compound with fiber reinforcement;

a plastic foam;

a liquid which is capable of crystallisation, sodium acetate; and an elastomer.

6. A telescopic crane slide bearing part as claimed in claim 1, wherein the receiver comprises a hollow body, portions of said hollow body contacting the mutually facing first and second slide surfaces, respectively, of the first and second relatively moveable jib sections.

7. A telescopic crane slide bearing part as claimed in claim 6, wherein the receiver comprises a shell, exterior portions of said shell contacting the mutually facing first and second slide surfaces, respectively, of the first and second relatively moveable jib sections.

8. A telescopic crane slide bearing part as claimed in claim 6, wherein said hollow body is a tubular body, exterior portions of said tubular body contacting the mutually facing first and second slide surfaces, respectively, of the first and second relatively moveable jib sections.

9. A telescopic crane slide bearing part as claimed in claim 1, wherein the receiver comprises a shell, exterior portions of said shell contacting the mutually facing first and second slide surfaces, respectively, of the first and second relatively moveable jib sections.

10. A telescopic crane slide bearing comprising a plurality of slide bearing parts as claimed in claim 1 disposed in mutual abutment to each other.

11. A telescopic crane slide bearing as claimed in claim 10, wherein the receivers of the respective slide bearing parts are of the same length.

12. A telescopic crane slide bearing as claimed in claim 10, wherein the receivers of the respective slide bearing parts are of different lengths.

13. A telescopic crane slide bearing as claimed in claim 10, in combination with a telescopic crane jib having at least two adjacent relatively telescopic jib parts including at least an outer telescopic jib part comprising a collar and an inner telescopic jib part comprising a base, wherein said slide bearing is disposed between the two adjacent telescopic parts of the crane jib in a jib portion comprising at least one of the collar of the outer telescopic part and the base of the inner telescopic part.

14. A telescopic crane slide bearing in combination with a telescopic crane jib as claimed in claim 13, further comprising an abutment in said jib portion, wherein said abutment is engaged by the receiver filled with the filler compound whereby said slide bearing is secured axially or in a peripheral direction with respect to said jib section.

15. A telescopic crane slide bearing as claimed in claim 14, wherein said abutment comprises a bead, an aperture or a web engaging said receiver or said filler compound.

* * * * *